(12) United States Patent  
Yantis et al.

(10) Patent No.: US 8,136,201 B2  
(45) Date of Patent: Mar. 20, 2012

(54) LEVELING LEG AND WHEEL ASSEMBLY FOR AN APPLIANCE

(75) Inventors: John Adam Yantis, Louisville, KY (US); Gerardo Picon Nunez, Querétaro (MX)

(73) Assignee: General Electric Company, Schenectady, NY (US)

( * ) Notice: Subject to any disclaimer, the term of this patent is extended or adjusted under 35 U.S.C. 154(b) by 455 days.

(21) Appl. No.: 12/414,887

(22) Filed: Mar. 31, 2009

(65) Prior Publication Data

US 2010/0244640 A1 Sep. 30, 2010

(51) Int. Cl.  
*B60B 33/06* (2006.01)

(52) U.S. Cl. .................... 16/32; 16/18 R; 16/19

(58) Field of Classification Search ........ 16/18 R, 16/19, 45, 29, 30, 32, 33, 34, 35 R, 37, 38, 16/39, 31 R, 31 A, 40, 42 R, 42 T, 43, 18 CG, 16/18 B; 312/249.8, 228, 351.1, 351.3, 351.11; 248/188.3, 188.2, 677, 188.6  
See application file for complete search history.

(56) References Cited

U.S. PATENT DOCUMENTS

| | | | | |
|---|---|---|---|---|
| 664,798 A | * | 12/1900 | Weidman | 16/32 |
| 1,749,751 A | * | 3/1930 | Bergsten | 16/44 |
| 3,844,578 A | | 10/1974 | Matyskella et al. | |
| 4,865,382 A | * | 9/1989 | Marshall | 248/188.2 |
| 4,991,805 A | | 2/1991 | Solak et al. | |
| 5,042,110 A | * | 8/1991 | Orii | 16/32 |
| 5,371,920 A | * | 12/1994 | Rainville | 16/18 CG |
| 5,431,254 A | * | 7/1995 | Kramer et al. | 188/7 |
| 5,971,408 A | | 10/1999 | Mandel et al. | |
| 6,591,449 B1 | * | 7/2003 | Parkin | 16/35 R |
| 6,637,071 B2 | * | 10/2003 | Sorensen | 16/32 |
| 6,839,937 B2 | | 1/2005 | Miller | |
| 6,871,379 B2 | | 3/2005 | Ebeling et al. | |
| 6,889,477 B1 | | 5/2005 | Kottman | |
| 6,923,419 B2 | | 8/2005 | George et al. | |
| 2002/0174512 A1 | * | 11/2002 | Sorensen | 16/18 R |
| 2007/0277350 A1 | * | 12/2007 | Hines | 16/35 R |

FOREIGN PATENT DOCUMENTS

JP 62214003 A * 9/1987

* cited by examiner

*Primary Examiner* — Victor Batson  
*Assistant Examiner* — Jeffrey O'Brien  
(74) *Attorney, Agent, or Firm* — Global Patent Operation; Douglas D. Zhang

(57) ABSTRACT

A leveling leg and wheel assembly for an appliance, including a first member having a first end attached to the appliance, and a second end opposite to the first end; a second member, one of the first member and the second member being slidably disposed in the other of the first member and the second member; a roller fixedly disposed relative to the first member and extending downward beyond the second end; a threaded sleeve fixedly disposed relative to the first member; and a leveling leg having an upper end, a lower end and a threaded portion therebetween, the threaded portion threadedly engaging the threaded sleeve so that rotation of the leveling leg causes the leveling leg to move, relative to the threaded sleeve, between a first position where the roller engages a ground surface and a second position where the leveling leg engages the ground surface.

20 Claims, 7 Drawing Sheets

US 8,136,201 B2

LEVELING LEG AND WHEEL ASSEMBLY FOR AN APPLIANCE

BACKGROUND OF THE INVENTION

The present invention relates generally to appliance supports, and more particularly to a leveling leg and wheel assembly for an appliance such as a free standing range.

Ranges, and other such appliances, can be large and bulky. The size and weight of larger ranges can, in some cases, be approximately 600 lbs. This can make it difficult to move and manipulate such a range, particularly after the range is positioned within its space. It would be advantageous to be able to easily move and level the range. While certain adjustment systems exist for rolling and adjusting the height of a range, in many cases the adjustment system is exposed to view. Since the looks and appearances of ranges are also important, it would be advantageous to be able to hide such adjustment systems from view when they are not being adjusted.

Moreover, once a range is moved into an installation space, such as a cabinet, it can also be difficult to access the legs or associated height and leveling devices, particularly with respect to the rear legs of the range. It would be advantageous to be able to roll a range into place without the use of other tools or dolleys, and easily access all height and leveling devices in order to level the range at each corner.

BRIEF DESCRIPTION OF THE INVENTION

As described herein, the exemplary embodiments overcome one or more of the above or other disadvantages known in the art.

One aspect of the exemplary embodiments relates to a leveling leg and wheel assembly for an appliance. The leveling leg and wheel assembly includes a first member having a first end attached to the appliance, and a second end opposite to the first end; a second member, one of the first member and the second member being slidably disposed in the other of the first member and the second member; a roller fixedly disposed relative to the first member and extending downward beyond the second end; a threaded sleeve fixedly disposed relative to the first member; and a leveling leg having an upper end, a lower end and a threaded portion therebetween, the threaded portion threadly engaging the threaded sleeve so that rotation of the leveling leg causes the leveling leg to move between a first position and a second position relative to the threaded sleeve. In the first position the lower end of the leveling leg is disposed above the roller so that the roller engages a ground surface. In the second position the lower end of the leveling leg is disposed below the roller so that the lower end engages the ground surface.

Another aspect of the disclosed embodiments relates to an appliance. The appliance includes a main body; and a leveling leg and wheel assembly in at least one corner region of the main body. The leveling leg and wheel assembly includes a first tubular member having a first end attached to the at least one corner region, and a second end opposite to the first end; a second tubular member, one of the first tubular member and the second tubular member being slidably disposed in the other of the first tubular member and the second tubular member; a roller fixedly disposed relative to the first tubular member and extending downward beyond the second end; a threaded sleeve fixedly disposed relative to the first tubular member; and a leveling leg having an upper end, a lower end and a threaded portion therebetween, the threaded portion threadly engaging the threaded sleeve so that rotation of the leveling leg causes the leveling leg to move between a first position and a second position relative to the threaded sleeve. In the first position the lower end of the leveling leg is disposed above the roller so that the roller engages a ground surface. In the second position the lower end of the leveling leg is disposed below the roller so that the lower end engages the ground surface.

These as other aspects and advantages of the exemplary embodiments will become more apparent from the following detailed description considered in conjunction with the accompanying drawings. It is to be understood, however, that the drawings are designed solely for the purposes of illustration and not as a definition of the limits of the invention, for which reference should be made to the appended claims. Moreover, the drawings are not necessarily to scale and that, unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
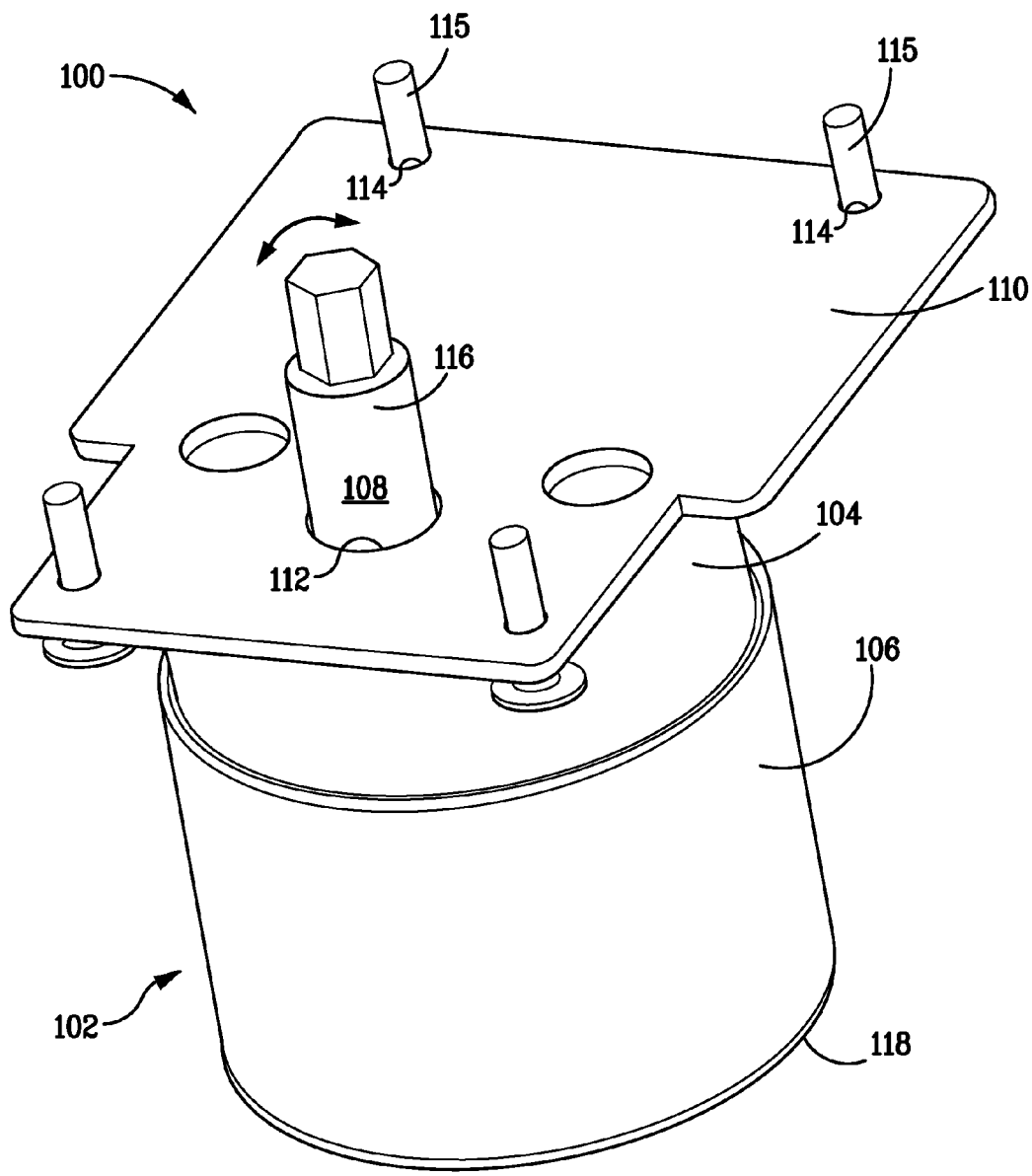
FIG. 1 is a perspective view of an exemplary leveling leg and wheel assembly of the invention.
Figure 7:
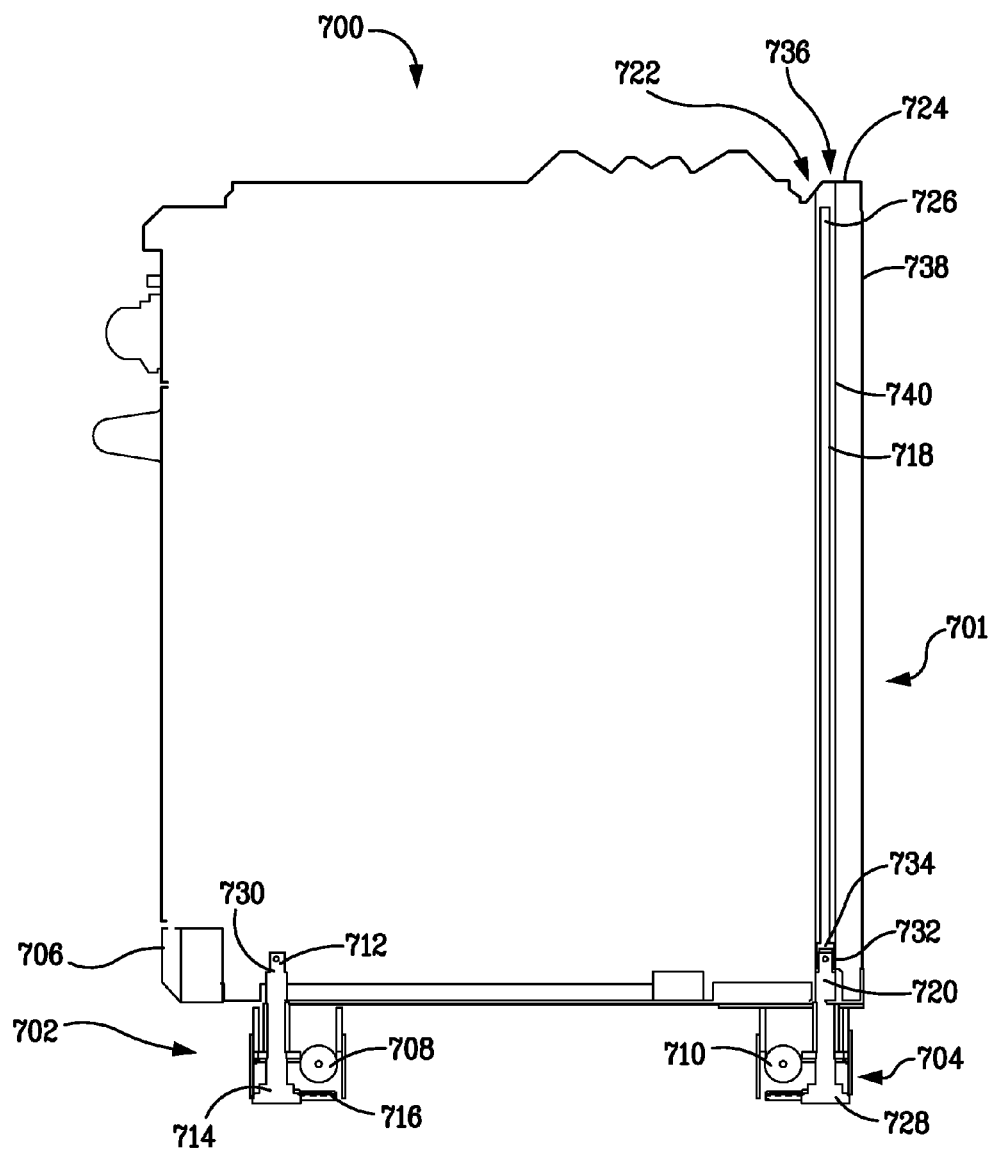
FIG. 7 is a cross-sectional view of a range incorporating the leveling leg and wheel assembly of FIG. 1.

Referring to FIG. 1, one embodiment of a leveling leg and wheel assembly 100 of the present invention is illustrated. Although the disclosed embodiments will be described herein with respect to a "range", in alternate embodiments, the leveling leg and wheel assembly 100 can be used with any suitable apparatus that needs height and leveling adjustment. Examples of such apparatus include, without limitation, refrigerators, freezers, dishwashers, washers, dryers or cabinets. One example of a range incorporating aspects of the disclosed embodiments is illustrated in FIG. 7.

The assembly 100 includes a first, fixed, tubular member 104 that is secured or mounted to an underside of the main body of the appliance. In the embodiments shown, the first member 104 has a substantially cylindrical shape, and is therefore referred to herein as the "inner" or "fixed" cylinder as well. Of course, the first member 104 can have other shape in cross section, such as square, rectangular, oval, etc. In one embodiment, the first member 104 is affixed to a mounting plate 110. The mounting plate 110 is in turn mounted to the underside of a corner region of the main body of the appliance via, for example, mounting holes 114 in the mounting plate 110 and bolts 115.

The leveling leg and wheel assembly 100 also includes a second, movable, tubular member 106. In the embodiments shown, the second member 106 has a substantially cylindrical shape, and therefore is referred to herein as the "movable" or "outer cylinder" as well. However, the second member 106 can have other shape in cross section, such as square, rectangular, oval, etc. The inner cylinder 104 is movably received in the outer cylinder 106. Although in the embodiments described herein the inner cylinder 104 is the fixed cylinder and the outer cylinder 106 is the movable cylinder, alternatively, the outer cylinder 106 could be fixed and the inner cylinder 104 could be movable.

The outer cylinder 106 is generally free-floating and sits on an end cap 118, which rests on a base member (not shown in FIG. 1). The end cap 118 moves up with the movement of the base member, as the leveling leg and wheel assembly 100 is adjusted. The outer cylinder 106 performs an appearance function and is configured to hide the inner components of the leveling leg and wheel assembly 100 from view, after adjustment. FIG. 1. illustrates the general position of the outer cylinder 106.

Within the cylindrical frame 102 formed by the inner and outer cylinders 104, 106 is a leveling leg 108. An upper end 116 of the leveling leg 108 extends through an opening 112 in the mounting plate 110. The bottom end (not shown in FIG. 1) of the leveling leg 108 engages the base member that supports the leveling leg and wheel assembly 100 and range. The leveling leg 108 is configured to be rotated in either direction in order to adjust a height of the leveling leg and wheel assembly 100, which in turn adjusts the height of the range.

Generally, in a typical installation, one leveling leg and wheel assembly 100 will be mounted in each corner of a range. Each leveling leg and wheel assembly 100 is separately adjusted to adjust the height and level the range. In alternate embodiments, any suitable number of leveling leg and wheel assemblies 100 can be used for height adjustment and leveling purposes. The leveling leg and wheel assembly 100 is also configured to support a weight of the range.

In the embodiment of FIG. 1, the leveling leg system 100 includes a roller (not shown), such as for example, a wheel, that allows the range to be rolled when the wheel is in contact with the ground surface or floor. In the example of FIG. 1, the wheel is not visible due to the position of the outer cylinder 106. The wheel is configured to be in contact with the floor when the leveling leg and wheel assembly 100 is in its lowest position or retracted configuration. The wheel(s) can be used to roll the range, for example, in and out of its installation space. It is a feature of the disclosed embodiments to be able to easily roll a range without the use of other tools or dolleys, and then level the range at each corner, while the range is in its installation space.

Figure 2:
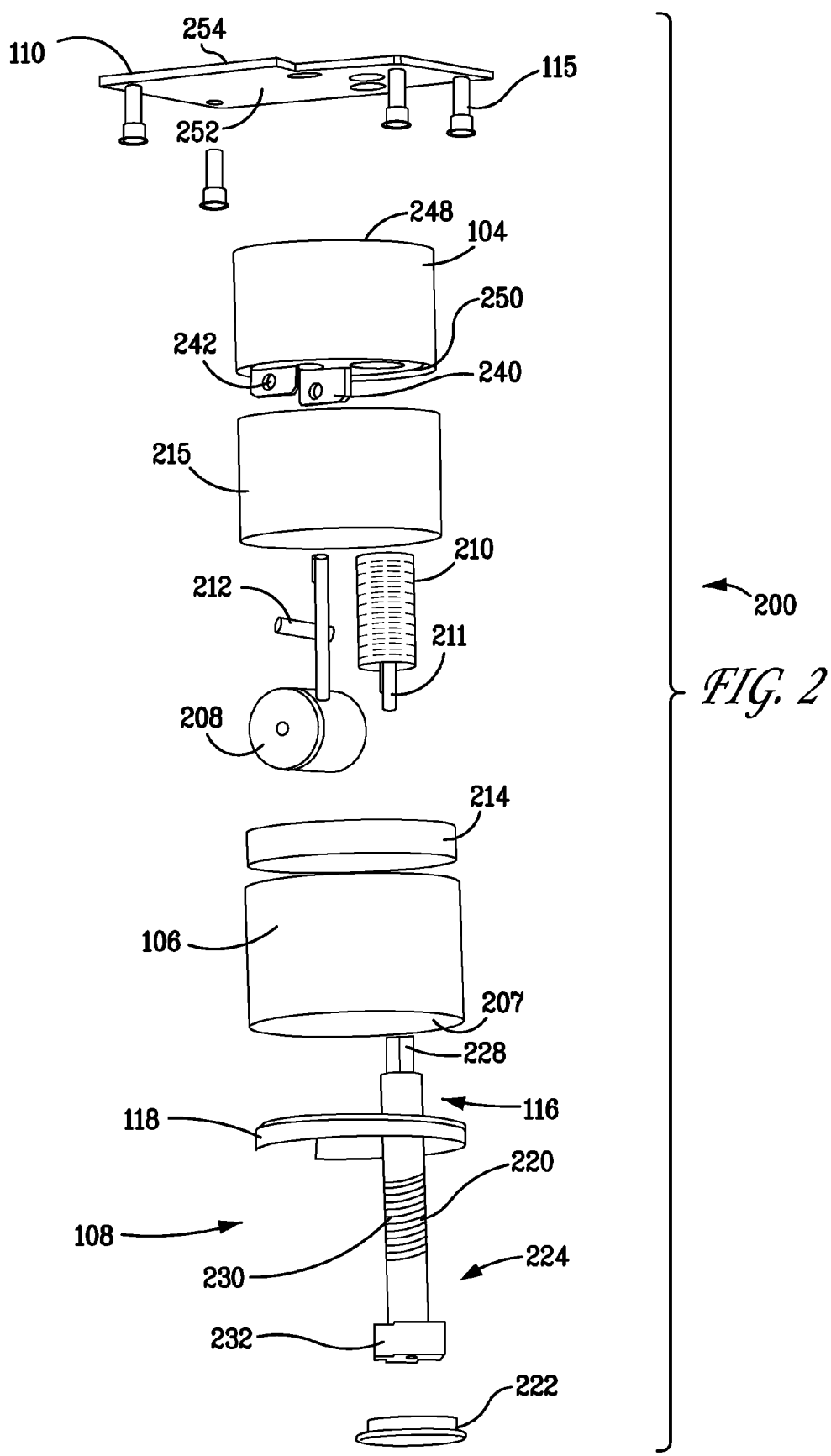
FIG. 2 is an exploded view of the leveling leg and wheel assembly of FIG. 1.

FIG. 2 is an exploded view of the leveling leg and wheel assembly 100 of FIG. 1, illustrating the component assembly 200 of the leveling leg and wheel assembly 100. As shown in the figure, the component assembly 200 includes a leveling leg 108, end cap 118, outer cylinder 106, wheel 208, threaded sleeve 210, axle 212, pad 214, inner cylinder 104 and mounting plate 110

The leveling leg 108 shown in FIG. 2 includes a shaft member 220, having upper end 116. In this embodiment, the shaft member 220 is a steel shaft. In alternate embodiments, any suitable material can be used for the shaft member 220. It is a feature of the disclosed embodiments that the shaft member 220 be able to support the weight of a range, which as noted earlier can in some cases be at least 600 lbs. A middle portion 230 of the shaft member 220 is threaded, with for example, an ACME power screw thread. A bottom end 224 of the shaft member 220 includes a base member 222, also referred to herein as a "foot pad". The base member 222 can be integral to the shaft member 220, or a separate member that is attached thereto. When the base member 222 is a separate member, the base member 222 is affixed to the bottom portion 224 of the shaft member 220 in any suitable fashion, such for example, a post-receiver coupling mechanism.

The upper end 116 of the shaft member 220 includes a first, upper adjustment member or head 228 that is used for rotating the leveling leg 108. In this embodiment, the first adjustment member 228 is a hexagonal or socket hex head. In alternate embodiments, any suitable adjustment member can be used that will allow a rotational force to be applied to the leveling leg 108, using a suitable device, including for example, a user's hand.

In this embodiment, the bottom end 224 of the leveling leg 108 includes a second, lower adjustment member 232 that is also configured to be used to rotate the leveling leg 108. As shown in FIG. 2, the second adjustment member 232 is a hexagonally shaped nut. The nut can be engaged by a corresponding wrench to turn or rotate the leveling leg 108 to adjust the height of the leveling leg and wheel assembly 100. In alternate embodiments, the second adjustment member 232 comprises any suitable mechanism for turning the leveling leg 108, other than including a hexagonally shaped nut. For example, in one embodiment, the second adjustment member 232 is configured to be turned by a user's hand.

In the embodiment of FIG. 2, the base member 222 is a separate piece, which is suitably shaped to receive the second adjustment member 232. More particularly, the second adjustment member 232 is hexagonal, and the base member 222 includes a corresponding hexagonal receiving section. Alternatively, the second adjustment member 232 could be integrally formed with the base member 222.

The base member 222 of the leveling leg 108 is generally configured to make contact with the ground surface to support the leveling leg and wheel assembly in place. The leveling leg 108 is generally configured to support the weight of the range. In one embodiment, the base member 222 has a shaped bottom surface to maintain effective contact with the pavement or ground surface, even in the presence of minor surface irregularities. In one embodiment, the material of the base member 222 is plastic. In alternate embodiments, the base member 222 will comprise any suitable material that provides for low turning friction and will minimize or prevent floor damage when the leveling leg 108 is turned.

Figure 4:
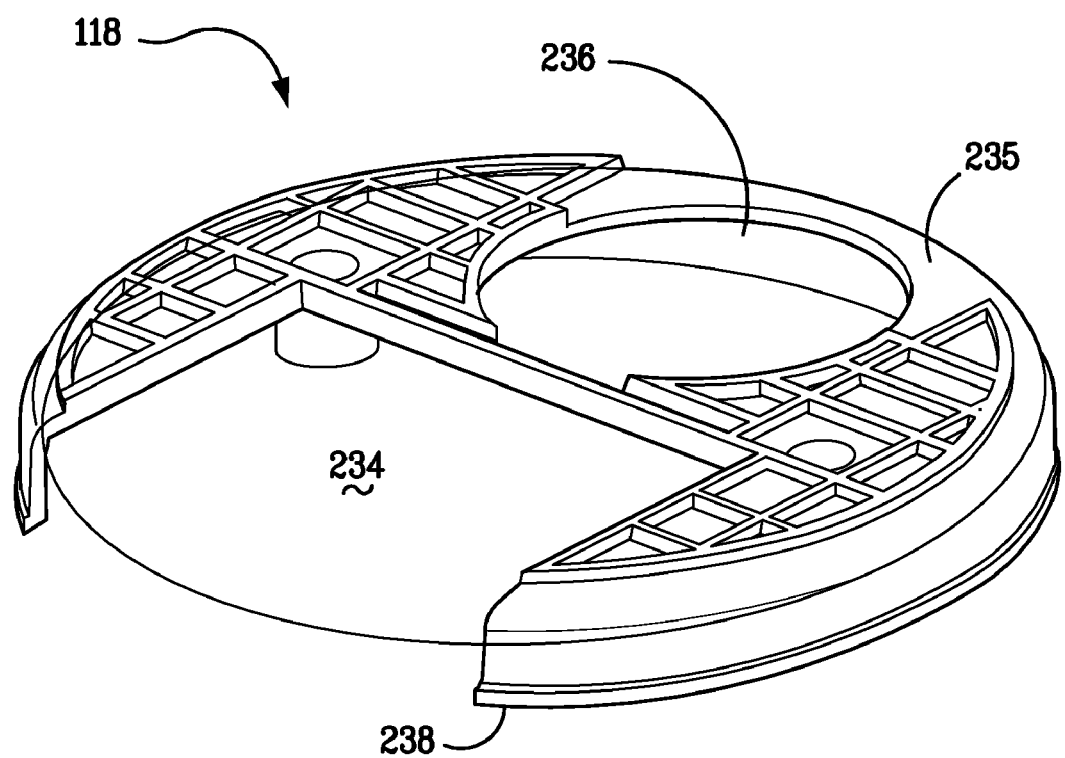
FIG. 4 is a perspective view of an exemplary end cap of the leveling leg and wheel assembly of FIG. 1.

The end cap 118 is configured to rest on the base member 222, and to support the outer cylinder 106, which is free floating, and prevent the outer cylinder 106 from directly contacting the floor. In one embodiment, a bottom edge 207 of the outer cylinder 106 rests on an outer edge or lip 238 of the end cap 118. Upward movement of the end cap 118 will cause a corresponding movement of the outer cylinder 106. As shown in FIG. 4, the lip 238 also acts as a barrier to prevent the outer cylinder 106 from directly contacting the floor in its normal position. The end cap 118 can also be used to provide additional structural strength to supplement outer cylinder 106 and protect the outer cylinder 106 from damage, such as denting, Referring now to FIG. 4, in one embodiment, the end cap 118 includes a top surface 235 that is configured to contain grease, liquids or other foreign objects. As shown in the embodiment of FIG. 4, the top surface 235 of the end cap 118 includes recesses formed by partitions that trap debris and liquids. The end cap 118 also acts as a barrier to obstruct foreign objects from entering into the areas of the leveling leg assembly from below the end cap 118.

As shown in FIG. 4, the end cap 118 includes opening 236 to allow the leveling leg 108 to pass through the end cap 118, and opening 234 configured to accommodate the roller 208 (FIG. 2).

Figure 3:
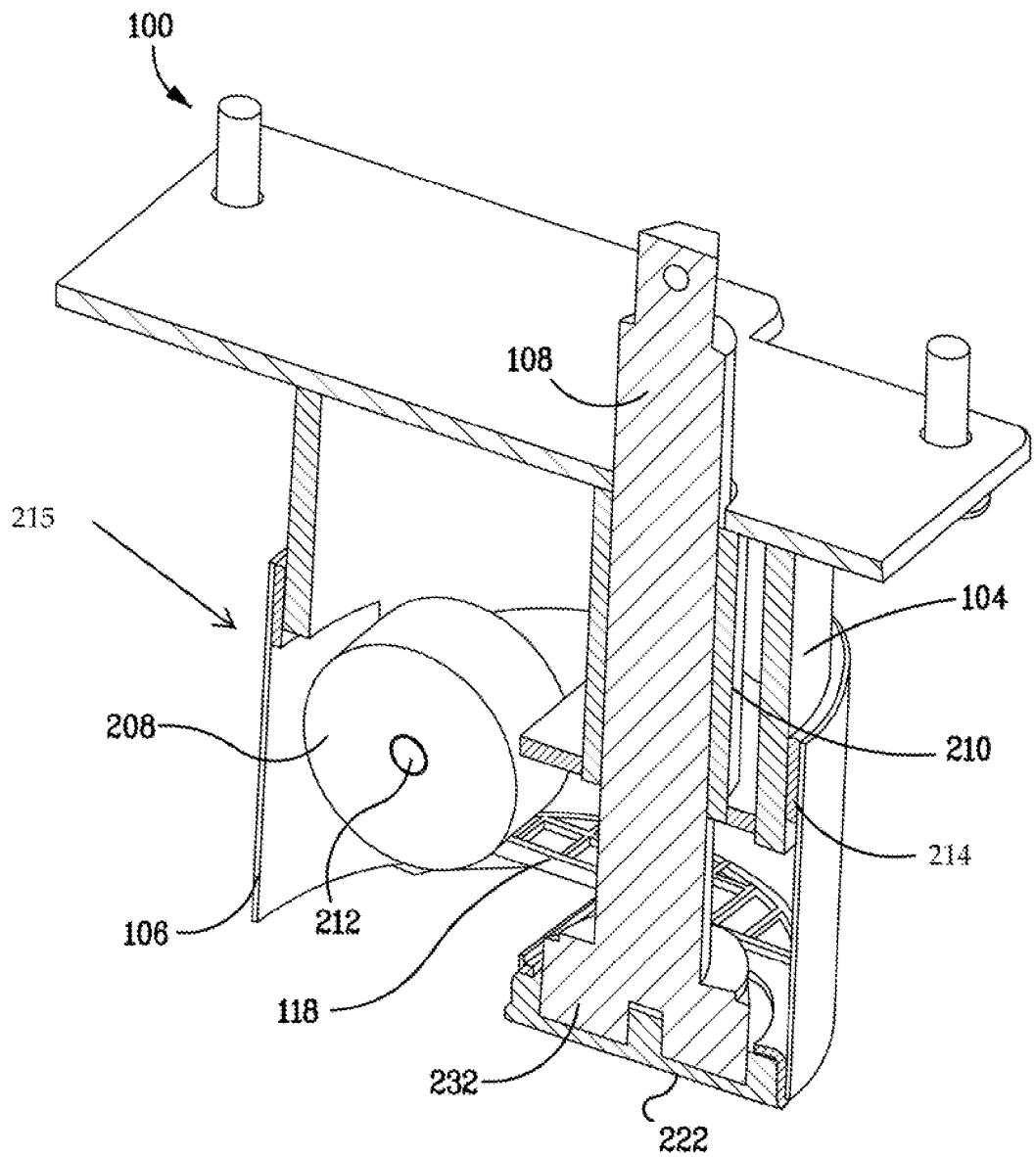
FIG. 3 is a cross-sectional view of the leveling leg and wheel assembly of FIG. 1 in an extended position (appliance high off ground)

Referring now to FIGS. 2 and 3, the roller 208, which will generally be referred to herein as a "wheel", is configured to support the weight of the range and allow the range to be rolled. The wheel 208 will make contact with the ground surface when the range is lowered substantially all the way down by rotating the leveling leg 118 upward into the threaded sleeve 210. The wheel 208 is attached to the inner cylinder 104 via axle 212. The axle 212 comprises a semi-tubular rivet that carries the load of the range when the range is rolled. In alternate embodiments, any suitable device can be used for the axle 212, other than including a semi-tubular rivet. For example, the axle can comprise a tubular member that is deformed into place. The axle 212 is coupled to the fixed cylinder 216 via openings 242 in ears 240. In one embodiment, the wheel 208 is a plastic or nylon material. In alternate embodiments, the wheel 208 comprises any material suitable for carrying a load of a range and allowing the range to be rolled. In this embodiment, the wheel 208 is configured to be bi-directional. That is, the wheel can rotate in either direction about its axle 212, but the orientation of the axle 212 is fixed such that the wheel does not swivel. When the wheel 208 is not in its lowermost position the wheel 208 will be hidden from view by the positioning of the outer cylinder 106.

The outer cylinder 106 is an appearance part and is generally configured to move vertically with the adjustment of the leveling leg 108, as well as obscure the wheel 208 and components associated with the leveling leg 108 from view. The outer cylinder 106 can comprise a material that will provide a suitable appearance, such as for example stainless steel. In alternate embodiments, any suitable material can be used, such as for example, plastic. In the embodiment of FIG. 2, two support rods 211 guide the sliding of the outer cylinder 106 as well as prevent rotation of the outer cylinder 106. One end of each support rod 211 is affixed to the end cap 118 and the other end extends through guides 506 (FIG. 5) in the bottom end wall of the inner cylinder 104.

The threaded sleeve 210 is affixed to an interior portion of the inner cylinder 104, such as for example, by welding, and is generally configured to engage the threaded portion 230 of the leveling leg 108. Sleeve 210 could alternatively be similarly affixed to the mounting plate 110. In one embodiment the threaded sleeve 210 includes threads on the interior surface of the sleeve 210. The threaded portion 230 of leveling leg 108 engages the threads of the sleeve 210 as the leveling leg 108 is turned. The threaded sleeve 210 is configured to be able to carry the load on the leveling leg 108. FIG. 3 shows that the threaded sleeve 210 is affixed to inner cylinder 104 with leveling leg 108 engaged therein.

Referring again to FIG. 2, the leveling leg component assembly 200 includes a spacer such as pad 214. The pad 214 is generally configured to provide a sliding surface for the outer cylinder 106 and prevent the inner cylinder 104 from coming into contact with the outer cylinder 106. Generally, the pad 214 is made of plastic, although in alternate embodiments, any suitable material can be used that provides a relatively frictionless surface between the outer cylinder 106 and the inner cylinder 104. The pad 214 is preferably affixed to the interior surface of the outer cylinder 106 in order to provide a sliding surface between the outer cylinder 106 and the inner cylinder 104.

Figure 5:
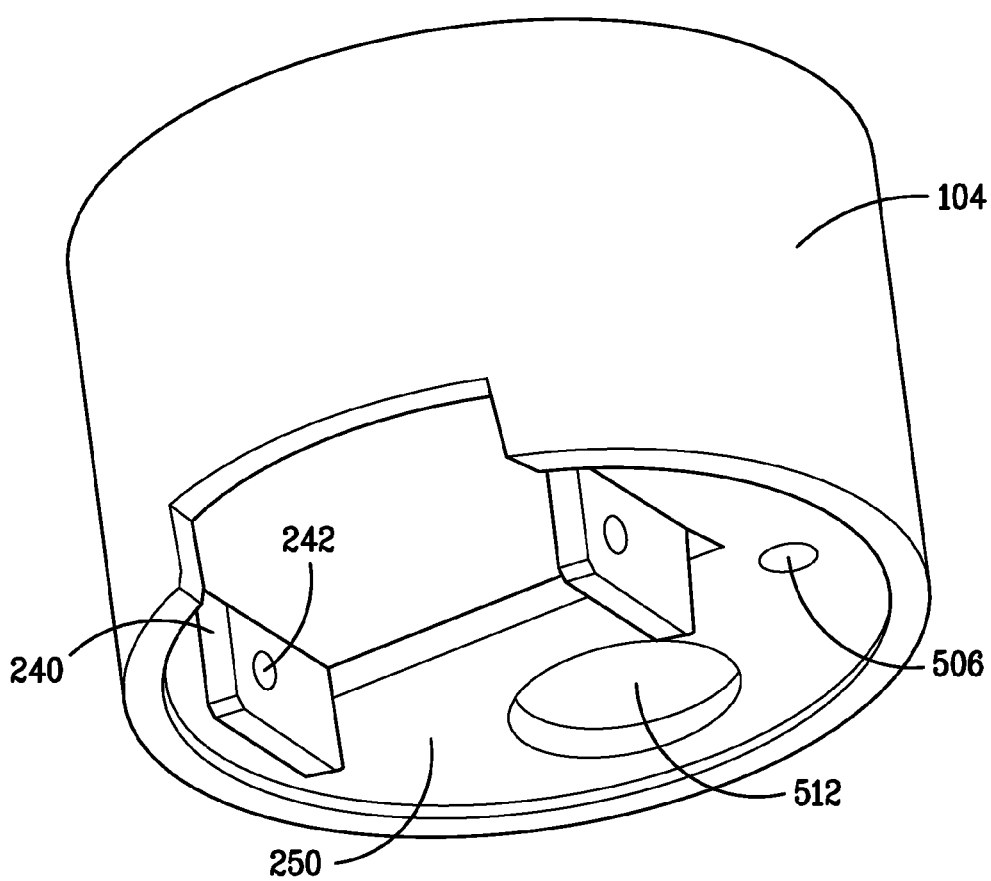
FIG. 5 is an perspective view of an exemplary first tubular member of the leveling leg and wheel assembly of FIG. 1.

The inner cylinder 104 of FIG. 2 is a structural and appearance part. The inner cylinder 104 comprises an open top end 248 and a bottom end 250. Ears 240 extend from each side of the bottom end 250 and have openings 242 to receive the axle 212. The top end 248 of the inner cylinder 104 is affixed to the mounting plate 110, by welding, for example. A more detailed view of inner cylinder 104 is shown in FIG. 5. Here, a bottom end wall 250 of the inner cylinder 104 has guides or openings 506 for receiving the support rods 211, ears 240 that include openings 242 configured to receive the axle 212, as well as an opening 512 to allow the leveling leg 108 to pass through the inner cylinder 104. In this embodiment, the inner cylinder 104 comprises a stainless steel material, although in alternate embodiments, any suitable material can he used that will support a weight and load of a range. In another embodiment, the inner cylinder 104 is made of relatively inexpensive metal such as steel, but is covered with a stainless steel appearance overlay 215 (see FIG. 2).

Referring again to FIG. 2, the mounting plate 110 is used to mount the leveling leg and wheel assembly 100 to the range. In this embodiment, the component side 252 of the mounting plate 110 is fixedly attached to the open end 248 of the inner cylinder 104, by for example, welding. The range side 254 of the mounting plate 110 is attached to the range. In this embodiment, the mounting plate 218 is bolted to the range, although in alternate embodiments, any suitable method can be used to fix the mounting plate 218 to the range, such as for example, welding or rivets. The component side 252 of the mounting plate is also fixedly attached to the threaded sleeve 210, by welding for example.

Leveling Leg Adjustment

Figure 6:
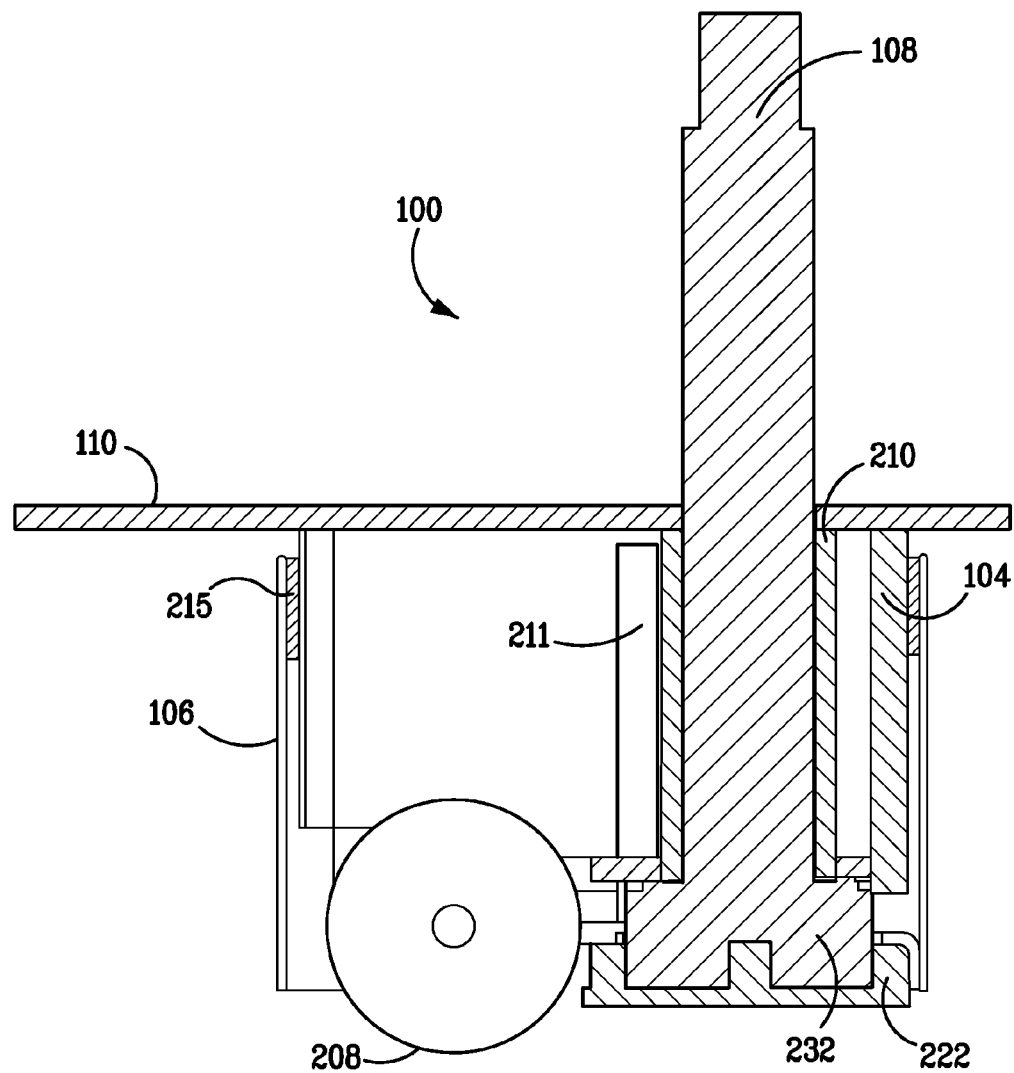
FIG. 6 is a cross-sectional view of the leveling leg and wheel assembly of FIG. 1 in a retracted position (appliance low to the ground, on wheels)

FIG. 3 and 6 illustrate the two positions of a leveling leg and wheel assembly 100. In FIG. 3, the leveling leg and wheel assembly 100 is in an extended position, with the range high off the ground. The leveling leg 108 has been rotated so that the sleeve 210 and the inner cylinder 104 have moved to an upper position. The outer cylinder 106 remains down with the base member 222 to cover the interior components, such as the adjustment member 232 and wheel 208, from view.

In FIG. 6, the leveling leg and wheel assembly 100 is in a retracted position. The leveling leg 108 has been rotated to lower the sleeve 106 and the inner cylinder 104. In this position, the leveling leg 108 has been rotated to bring the wheel 208 in contact with the ground. In this configuration, the base member 222 is lifted off the ground. This allows the range to be rolled on the wheel 208. The outer cylinder 106 moves with the base member 222. This allows at least a portion of wheel 208 to be exposed.

FIG. 7 illustrates a cross-sectional view of an exemplary range 700 incorporating features of the disclosed embodiments. As shown in FIG. 7, the range 700 has a pair of front leveling leg and wheel assemblies 702 and a pair of rear leveling leg and wheel assembles 704. A leveling leg and wheel assembly is located in each of the four corner regions of the main body 701 of the range 700.

In the example shown in FIG. 7, the leveling leg and wheel assemblies 702, 704 are in an extended or raised position. Thus, the leveling leg and wheel assemblies 702, 704 support the range 700 and the wheels 708, 710 are not in contact with the ground. When each of the leveling leg and wheel assemblies 702, 704 is in its fully retracted position, the range will rest on the wheels 708, 710.

Referring to the example shown in FIG. 7, in one embodiment, in order to adjust the front leveling leg and wheel assemblies 702, the outer cylinder 716 can be lifted up to expose the lower adjustment member 714. Using a suitable instrument, such as the user's hand or a wrench, the lower adjustment member 714 is turned to raise or lower each of the front leveling legs 712. When the adjustment is complete, the outer cylinder 716 can be moved down to cover the wheels 708, unless the wheels 708 have been fully lowered.

In the embodiment shown in FIG. 7, the front leveling leg and wheel assemblies 702 can also be adjusted using the upper adjustment member 730. This could be advantageous when the leveling leg and wheel assemblies 702 are fully retracted, and the range 700 is resting on the wheels 708. The range 700 can include a front access panel 706 that can be removed to access the front leveling leg and wheel assemblies 702. In such a case, the front access panel 706 is removed to expose the upper adjustment member 730. A suitable wrench, such as an open ended or box wrench, is the used to turn each front leveling leg 712 in order to raise or lower the front leveling leg and wheel assemblies 702.

The rear leveling leg and wheel assemblies 704 are also capable of being adjusted using either the lower adjustment member 728 or the upper adjustment member 732 associated with each rear leveling leg and wheel assembly 704. However, unless the appliance installation space provides easy access to the rear leveling leg and wheel assembly 704, it may prove difficult or impossible to access each upper adjustment member 732. It is a feature of the disclosed embodiments to allow the rear leveling leg and wheel assemblies 704 to be adjusted, even when the range 700 is mounted in an installation space or the real leveling legs cannot be easily accessed.

In the example shown in FIG. 7, an extension rod 718 can be accessed through an opening 722 in a top 724 of the range 700. As shown in FIG. 7, the extension rod 718 is located in a channel or chamber 740 along a rear section 738 of the range 700. In alternate embodiments, the extension rod 718 can be located along any suitable region of the range 700. It is a feature of the disclosed embodiments to be able to access the height and leveling adjustments for an appliance, such as range 700, even when the physical location of the height and leveling adjustments on the range make them difficult to access.

The extension rod 718 is configured to engage and securely couple to the upper adjustment member 732 on each of the rear leveling leg and wheel assemblies 704. The extension rod 718 can be turned from the top 724 of the range to rotate the rear leveling leg 720.

The extension rod 718 includes a head 734 at one end that will couple to, and securely engage the adjustment member 732. In one embodiment, the head 734 comprises a socket head. In alternate embodiments, any suitable coupling mechanism can be used or included, such as for example, a pin or set screw.

The end 726 of the extension rod 718 closest to the top of the range 700 is configured to be engaged by an adjustment tool (not shown), such as for example a wrench, that will allow the extension rod 718 to be rotated in order to raise and lower the respective rear leveling leg and wheel assembly 704. The end 726 of the extension rod 718 can include a socket head or such similar adjustment device.

In one embodiment, a rear trim member 736 can be removed to expose and access the opening 722. Each rear leveling leg and wheel assembly 704 can then be adjusted by turning the extension rod 718 as described. In one embodiment, the range 700 can be configured to also allow adjustment of the front leveling leg and wheel assemblies 702 from the top of the range 700.

As shown in FIG. 7, the extension rod 718 comprises a single piece rod. In alternate embodiments, any suitably size rod member can be utilized for the extension rod 718, including for example a sectional rod. The extension rod 718 can also be removable, so that only one extension rod 718 is needed per range 700. The extension rod 718 could be moved between openings 722.

Although the extension rod 718 is shown in a substantially vertical alignment relative to the range 700, in alternate embodiments, the extension rod 718 can be configured in any suitable alignment. For example, by making use of articulating joints at the coupling of the rear adjustment member 732 and the extension rod 718, the alignment of the extension rod 718 could be angled towards a front of the range 700. Adjustment of the rear leveling leg 720 could then take place from a front area of the range 700.

Thus, while there have been shown and described and pointed out fundamental novel features of the invention as applied to the exemplary embodiments thereof, it will be understood that various omission and substitutions and changes in the form and details of devices illustrated, and in their operation, may be made by those skilled in the art without departing from the spirit of the invention. For example, it is expressly intended that all combinations of those elements and/or method steps which perform substantially the same way to achieve the same results are with the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A leveling leg and wheel assembly for an appliance, comprising:
    a first member comprising a first end attachable to the appliance, and a second end opposite to the first end;
    a second member, one of the first member and the second member being slidably disposed in the other of the first member and the second member;
    a roller fixedly disposed relative to the first member, extending downward beyond the second end of the first member, and disposed within the second member,
    a threaded sleeve fixedly disposed relative to the first member; and
    a leveling leg comprising an upper end, a lower end and a threaded portion therebetween, the threaded portion of the leveling leg threadedly engaging the threaded sleeve so that rotation of the leveling leg causes the leveling leg to move between a first position and a second position relative to the threaded sleeve,
    wherein in the first position the lower end of the leveling leg is disposed above the roller so that the roller engages a ground surface, and
    wherein in the second position the lower end of the leveling leg is disposed below the roller so that the lower end engages the ground surface.

2. The leveling leg and wheel assembly of claim 1, wherein the lower end of the leveling leg is configured to couple to and move the second member together with the leveling leg when the leveling leg moves in a direction from the second position to the first position.

3. The leveling leg and wheel assembly of claim 2, further comprising an end cap attached to the second member, the lower end of the leveling leg engaging the end cap when the leveling leg moves in the direction from the second position to the first position.

4. The leveling leg and wheel assembly of claim 2, wherein the second member covers the lower end of the leveling leg from view when the leveling leg is in the second position.

5. The leveling leg and wheel assembly of claim 1, further comprising a mounting plate attached to the first end of the first member and for attachment to the appliance, the upper end of the leveling leg extending upward beyond the mounting plate.

6. The leveling leg and wheel assembly of claim 1, wherein at least one of the upper end and the lower end comprises an adjustment member.

7. The leveling leg and wheel assembly of claim 1, wherein the first member and the second member are tubular in shape.

8. The leveling leg and wheel assembly of claim 1, wherein the roller is disposed within the first member.

9. An appliance comprising:
a main body; and
a leveling leg and wheel assembly in at least one corner region of the main body, the leveling leg and wheel assembly comprising:
a first tubular member comprising a first end attached to the at least one corner region, and a second end opposite to the first end;
a second tubular member, one of the first tubular member and the second tubular member being slidably disposed in the other of the first tubular member and the second tubular member;
a roller fixedly disposed relative to the first tubular member, extending downward beyond the second end of the first tubular member, and disposed within the second tubular member;
a threaded sleeve fixedly disposed relative to the first tubular member; and
a leveling leg comprising an upper end, a lower end and a threaded portion therebetween, the threaded portion of the leveling leg threadly engaging the threaded sleeve so that rotation of the leveling leg causes the leveling leg to move between a first position and a second position relative to the threaded sleeve,
wherein in the first position the lower end of the leveling leg is disposed above the roller so that the roller engages a ground surface, and
wherein in the second position the lower end of the leveling leg is disposed below the roller so that the lower end engages the ground surface.

10. The appliance of claim 9, wherein the lower end of the leveling leg is configured to couple and move the second tubular member together with the leveling leg when the leveling leg moves in a direction from the second position to the first position.

11. The appliance of claim 10, wherein the leveling leg and wheel assembly further comprises an end cap attached to the second tubular member, the lower end of the leveling leg engaging the end cap when the leveling leg moves in the direction from the second position to the first position.

12. The appliance of claim 10, wherein the second tubular member covers the lower end of the leveling leg from view when the leveling leg is in the second position.

13. The appliance of claim 9, wherein the leveling leg and wheel assembly further comprises a mounting plate disposed between the at least one corner region and the first tubular member, and attached to the first end of the first tubular member and the at least one corner region, the upper end of the leveling leg extending upward beyond the mounting plate and disposed in a chamber of the main body.

14. The appliance of claim 13, wherein the leveling leg and wheel assembly is in a rear corner region of the main body, the chamber extending upward and terminating at a top surface of the main body.

15. The appliance of claim 14, further comprising an extension rod disposed in the chamber, the extension rod being securable to the upper end of the leveling leg for rotating the leveling leg.

16. The appliance of claim 9, wherein at least one of the upper end and the lower end comprises an adjustment member.

17. The appliance of claim 9, wherein each of the upper end and the lower end comprises an adjustment member.

18. The appliance of claim 9, the first tubular member and the second tubular member are substantially cylindrical in shape, the first tubular member being disposed in the second tubular member.

19. The appliance of claim 18, wherein the leveling leg and wheel assembly further comprises a spacer disposed between the first tubular member and the second tubular member.

20. The appliance of claim 9, wherein the appliance is a range.

* * * * *